United States Patent
Iida et al.

(10) Patent No.: US 8,631,888 B2
(45) Date of Patent: Jan. 21, 2014

(54) COWLING STRUCTURE FOR SADDLE-RIDE TYPE VEHICLE

(75) Inventors: Omi Iida, Saitama (JP); Jun Hirose, Saitama (JP); Shigeto Inami, Saitama (JP); Nobutaka Ban, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 368 days.

(21) Appl. No.: 13/012,198

(22) Filed: Jan. 24, 2011

(65) Prior Publication Data

US 2011/0180345 A1    Jul. 28, 2011

(30) Foreign Application Priority Data

Jan. 27, 2010  (JP) ................................ 2010-015235

(51) Int. Cl.
  *B60K 11/06*    (2006.01)
(52) U.S. Cl.
  USPC ........................................ 180/68.1; 180/68.2
(58) Field of Classification Search
  USPC ............................................... 180/68.1, 68.2
  See application file for complete search history.

(56) References Cited

U.S. PATENT DOCUMENTS

| | | | | |
|---|---|---|---|---|
| 4,570,740 A * | 2/1986 | Hara | | 180/229 |
| 4,685,530 A * | 8/1987 | Hara | | 180/219 |
| 4,830,135 A * | 5/1989 | Yamashita | | 180/229 |
| 4,913,256 A * | 4/1990 | Sakuma | | 180/229 |
| 6,276,482 B1 * | 8/2001 | Moriya et al. | | 180/229 |
| 7,370,902 B2 * | 5/2008 | Seki et al. | | 296/78.1 |
| 7,387,180 B2 * | 6/2008 | Konno et al. | | 180/68.3 |
| 7,399,029 B2 * | 7/2008 | Takeshita | | 296/203.01 |
| 7,410,025 B2 * | 8/2008 | Sunaguchi et al. | | 180/229 |
| 7,448,461 B2 * | 11/2008 | Misaki et al. | | 180/68.4 |
| 7,556,115 B2 * | 7/2009 | Iwanaga | | 180/229 |
| 7,793,748 B2 * | 9/2010 | Takahashi et al. | | 180/219 |
| 8,006,791 B2 * | 8/2011 | Nakagome et al. | | 180/68.1 |
| 8,006,792 B2 * | 8/2011 | Nakao et al. | | 180/68.1 |
| 8,087,485 B2 * | 1/2012 | Kitamura | | 180/68.1 |
| 8,230,958 B2 * | 7/2012 | Takahashi et al. | | 180/68.1 |
| 2005/0224266 A1 * | 10/2005 | Konno et al. | | 180/68.1 |
| 2009/0108629 A1 * | 4/2009 | Takahashi et al. | | 296/192 |
| 2009/0108630 A1 * | 4/2009 | Nakao et al. | | 296/192 |
| 2011/0180345 A1 * | 7/2011 | Iida et al. | | 180/309 |

FOREIGN PATENT DOCUMENTS

JP        4028691 B2    10/2002

* cited by examiner

*Primary Examiner* — Jeffrey J Restifo
(74) *Attorney, Agent, or Firm* — Birch, Stewart, Kolasch & Birch, LLP (57) ABSTRACT

A cowling structure for a saddle-ride type vehicle for cooling an engine and providing a windshield for a rider. The cowling structure includes a seat for a rider to sit thereon, the seat is arranged behind and above an engine suspended from a vehicle body frame. An under cowl covers at least part of a lower portion of the engine. The under cowl is formed to cover at least part of a side surface of the engine. A guide portion is provided in an upper portion of the under cowl, the guide portion extending inward in a vehicle width direction and toward the side surface of the engine. An opening is provided in front of the guide portion, the opening introducing a flow of air into the under cowl. The guide portion has a slope surface which slopes downward from the front to the rear of the vehicle.

15 Claims, 7 Drawing Sheets

COWLING STRUCTURE FOR SADDLE-RIDE TYPE VEHICLE

CROSS-REFERENCE TO RELATED APPLICATIONS

The present application claims priority under 35 USC 119 to Japanese Patent Application No. 2010-015235 filed on Jan. 27, 2010 the entire contents of which are hereby incorporated by reference.

BACKGROUND OF THE INVENTION

1. Field of the Invention

The present invention relates to a cowling structure for a saddle-ride type vehicle. More particularly, to an under cowl arranged at a lower portion of a vehicle.

2. Description of Background Art

As a cowling structure for a saddle-ride type vehicle, there has been conventionally known a cowling structure for a saddle-ride type vehicle as shown, for example, in Japanese Patent No. 4028691. The cowling structure for a saddle-ride type vehicle will be described below using the reference numerals used in the same document. In the cowling structure for a saddle-ride type vehicle, a muffler (70) is arranged below an engine (40) of a motorcycle, an under cowl (121) is arranged to cover left and right side surfaces of the muffler (70), and an air inlet port (123) for cooling the muffler is formed in a front portion of the under cowl (121).

In the conventional cowling structure for a saddle-ride type vehicle mentioned above, the under cowl (121) is in a dedicated form to cool the muffler (70), but no considerations are made on the performances of cooling the engine and of wind-shielding for a rider.

SUMMARY AND OBJECTS OF THE INVENTION

An object of an embodiment of the present invention, is to provide a cowling structure for a saddle-ride type vehicle, the structure being capable of improving performances of cooling an engine and of wind-shielding for a rider.

For the purpose of solving the above-mentioned problems, a cowling structure for a saddle-ride type vehicle of the present invention includes a vehicle body frame; an engine suspended from the vehicle body frame; a seat for a rider to sit thereon, the seat arranged behind and above the engine; and an under cowl which covers at least part of a lower portion of the engine. The under cowl is formed to cover at least part of a side surface of the engine. A guide portion is provided in an upper portion of the under cowl, the guide portion extending inward in a vehicle width direction and toward the side surface of the engine. An opening is provided in front of the guide portion, the opening introducing a flow of air into the under cowl.

According to an embodiment of the present invention, with the cowling structure for a saddle-ride type vehicle a flow of air can be guided to the side surface of the engine by means of the opening and the guide portion, even though the side surface of the engine is covered with the under cowl. This improves the performance of cooling the engine.

Desirably, in the structure, the guide portion has a slope surface which slopes downward from the front to the rear of the vehicle.

In this configuration, the slope surface of the guide portion can guide a flow of air toward the lower portion of the under cowl, not toward the upper portion thereof. This allows improvement in the wind-shielding effect for a rider.

More desirably, in the structure, the under cowl is formed in a V shape with a vertex at a lower end thereof in a front view, and is also formed in such a shape that, in a plan view, its width is larger toward the rear.

In this configuration, the flow of air guided by the outer surface of the under cowl is more likely to flow outward in the vehicle width direction. This allows for an improvement in the wind-shielding performance for a rider.

More desirably, in the structure, a flow of air introduction portion is provided between the under cowl and a front portion of the engine, and a flow of air release portion is provided between the under cowl and a lower portion of the engine.

In this configuration, the flow of air introduced from the flow of air introduction portion between the under cowl and the front portion of the engine is more easily emitted from the flow of air release portion between the under cowl and the lower portion of the engine. This allows improvement in the performance of the cooling of the engine as well as suppression of the flowing of warm air to a rider.

More desirably, in the structure, a muffler is arranged at a rear side of the slope surface, and an exhaust pipe connected to the muffler is arranged along the under cowl.

In this configuration, the flow of air oriented by the slope surface of the guide portion is more likely to flow to the exhaust pipe and the muffler. This also allows for cooling of the exhaust pipe and the muffler.

More desirably, in the structure, the under cowl has a rear portion thereof fixed to the vehicle body frame and has a front portion thereof fixed to a cover member hung on a side surface of the vehicle.

In this configuration, in the fixation of the under cowl to the vehicle body, the under cowl front portion is fixed to the vehicle body via the cover member. For this reason, the under cowl itself is easily deformable when a flow of air exerts a strong effect thereon. This consequently causes a clearance between the under cowl and the engine or any other vehicle body component to expand more likely, thereby achieving a favorable flow of the air. Moreover, the configuration achieves a reduction in the weight of the under cowl. The configuration also achieves a reduction in the number of portions fastened to the vehicle body, thereby achieving improvement in productivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(a) and 4(b) are views each showing the under cowl, where

DETAILED DESCRIPTION OF THE PREFERRED EMBODIMENTS

Hereinbelow, an embodiment of a cowling structure for a saddle-ride type vehicle according to the present invention will be described with reference to the drawings.

Figure 1:
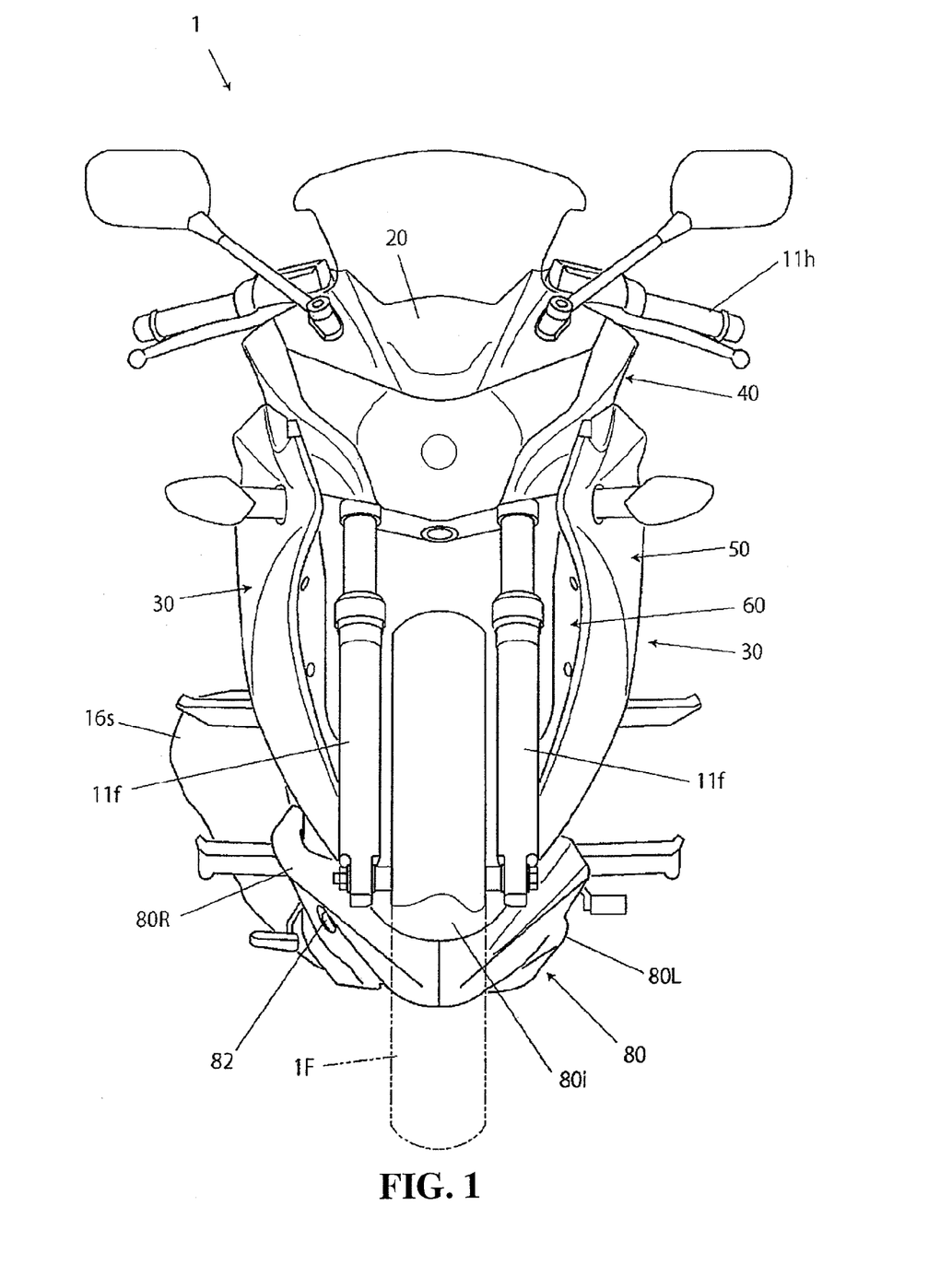
FIG. 1 is a front view of a motorcycle which is an example of a saddle-ride type vehicle employing a cowling structure for a saddle-ride type vehicle according to the present invention.
Figure 2:
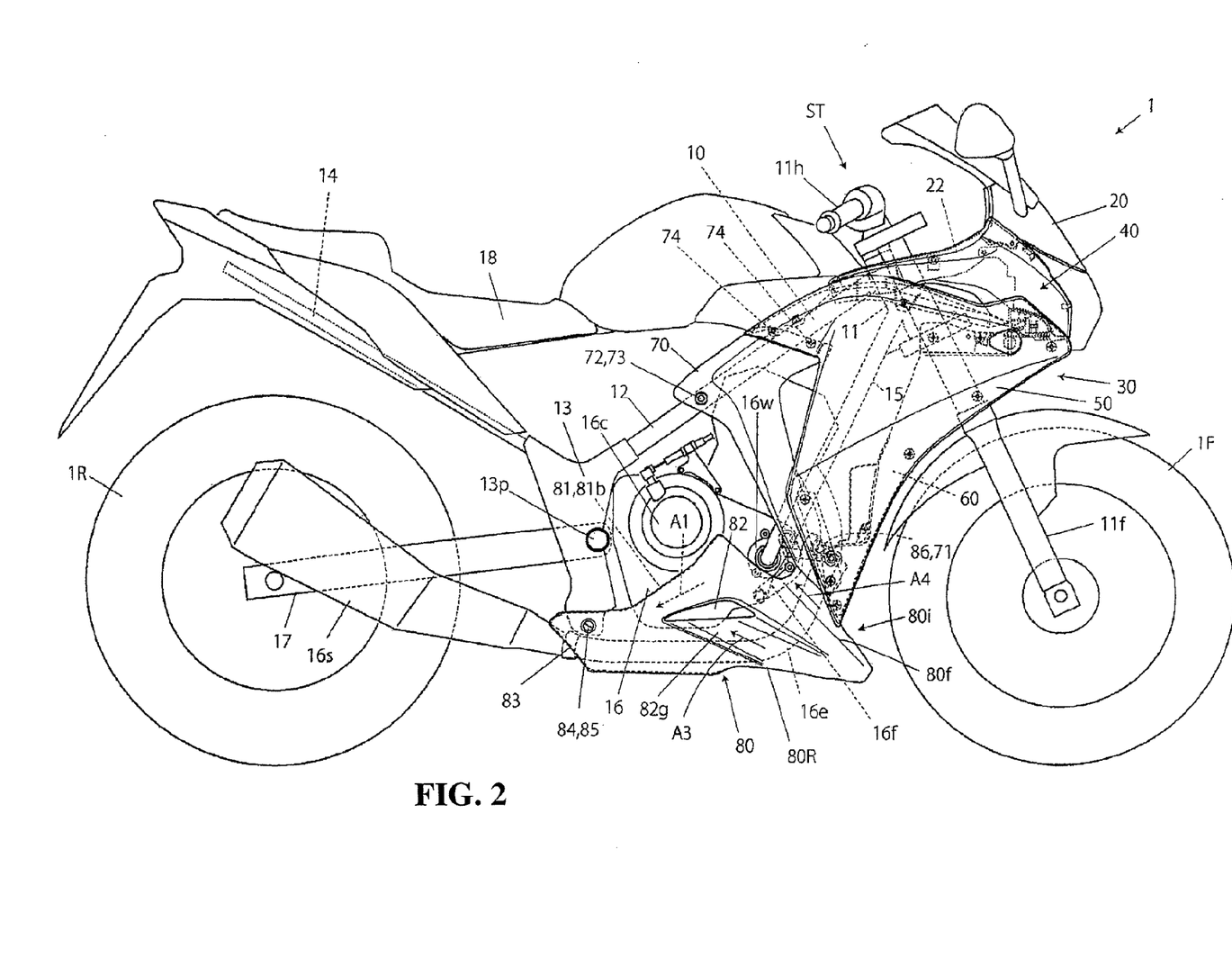
FIG. 2 is a side view of the same.

As shown in FIG. 1 and FIG. 2, a motorcycle 1 includes a vehicle body frame 10 which constitutes a vehicle body. The vehicle body frame 10 includes a head pipe 11 which constitutes a front end of the vehicle body frame 10; a main frame 12 which extends rearwardly from the head pipe 11; a pivot plate 13 which is provided at a rear portion of the main frame 12; a seat rail 14 which extends rearwardly from the pivot plate 13 and the main frame 12; and a down tube 15 which extends downwardly to the rear from the head pipe 11.

The head pipe 11 holds a steering device ST in such a way that the steering device ST is rotatable in front of the head pipe 11 around the axis of the head pipe 11. The steering device ST can be configured by employing a publicly-known basic configuration. The steering device ST includes a handlebar 11h and a pair of front forks 11f which support a front wheel 1F rotatably.

An engine 16 is suspended from (fixed to) the main frame 12, the pivot plate 13, and the down tube 15.

An exhaust pipe 16e is connected to the engine 16 and a muffler 16s is connected to the exhaust pipe 16e. A clutch cover 16c and a water pump 16w are provided.

A swing arm 17 is attached to the pivot plate 13 to be swingable vertically at a pivot shaft 13p. A rear wheel 1R, which is a driving wheel, is rotatably attached to a rear end portion of the swingarm 17. The rear wheel 1R is driven by the engine 16.

Over the seat rail 14, a seat 18 is provided on which a rider sits. The seat 18 is arranged behind and above the engine 16.

The cowling structure of the embodiment includes a front cowl 20 which covers a front portion of the vehicle body; a side cowl 30 which covers left and right sides of the vehicle body; and an under cowl 80 which covers at least part of a lower portion of the engine 16. The side cowl 30 includes an upper cowl 40 arranged on an upper portion of the vehicle; and a middle cowl 50 arranged below the upper cowl 40.

These cowls can be attached to the vehicle body frame 10 directly or indirectly by means of an appropriate configuration.

For example, the front cowl 20 may be attached to a stay 22 which is provided to project forward from the head pipe 11. The upper cowl 40 may be directly attached to the stay 22, in the same way as the front cowl 20 is, or may be attached to the stay 22 with the front cowl 20 interposed in between. Having an inner panel 60 arranged on the inner side and a side panel 70 arranged at the rear, the middle cowl 50 may be attached to the vehicle body frame 10 with the inner panel 60 and the side panel 70 interposed in between. Each of the inner panel 60 and the side panel 70 may be attached to the vehicle body frame 10 directly or indirectly.

The under cowl 80 may also be attached to the vehicle body frame 10 directly or indirectly. The specific example of the attachment will be described later.

The embodiment is characterized by the structure of the under cowl 80.

More specifically, as shown in FIG. 2, the under cowl 80 is formed to cover at least part of the side surfaces of the engine 16. Moreover, as shown in FIG. 2 and FIG. 4(a) to FIG. 6, in an upper portion of the under cowl 80, guide portions 81 are provided which are directed and extend inward in a vehicle width direction and toward the respective side surfaces of the engine. Openings 82 are provided respectively in front of the guide portions 81 to introduce a flow of air into the under cowl 80.

Figure 4A:
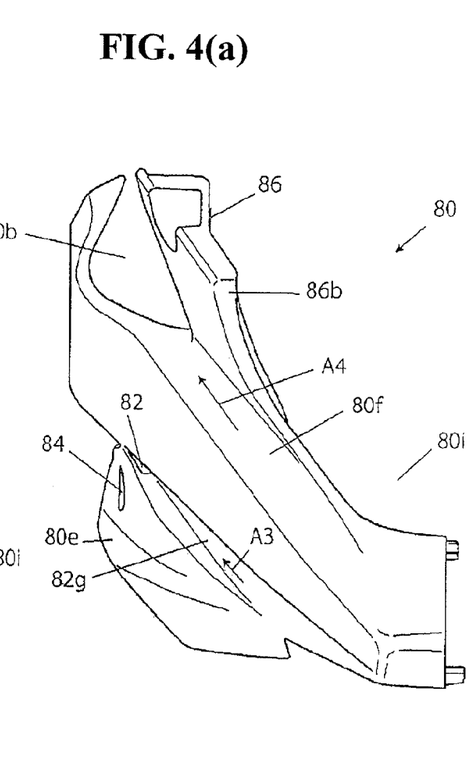
FIG. 4(a) is a front view thereof and FIG. 4(b) is a side view thereof.
Figure 6:
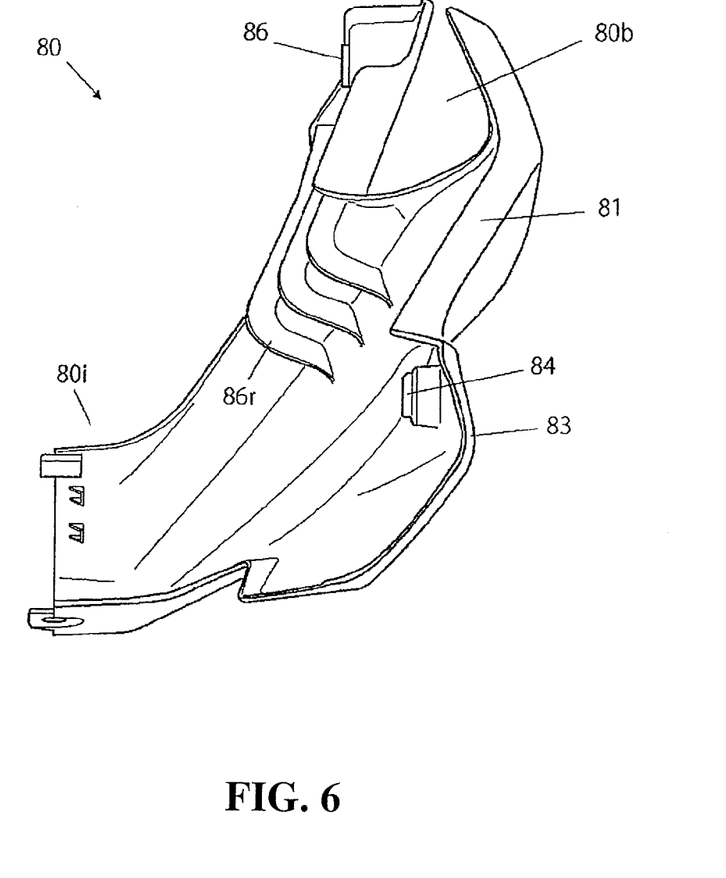
FIG. 6 is a back view also showing the under cowl (a view seen from the rear of the vehicle body)

Such a cowling structure can introduce a flow of air to the side surfaces of the engine by means of the openings 82 and the guide portions 81, even though the side surfaces of the engine 16 are covered with the under cowl 80. In other words, the flow of air which is introduced into the under cowl 80 from, the openings 82 is guided to the engine 16 by the guide portions 81. This improves the performance of the cooling of the engine 16.

Figure 3:
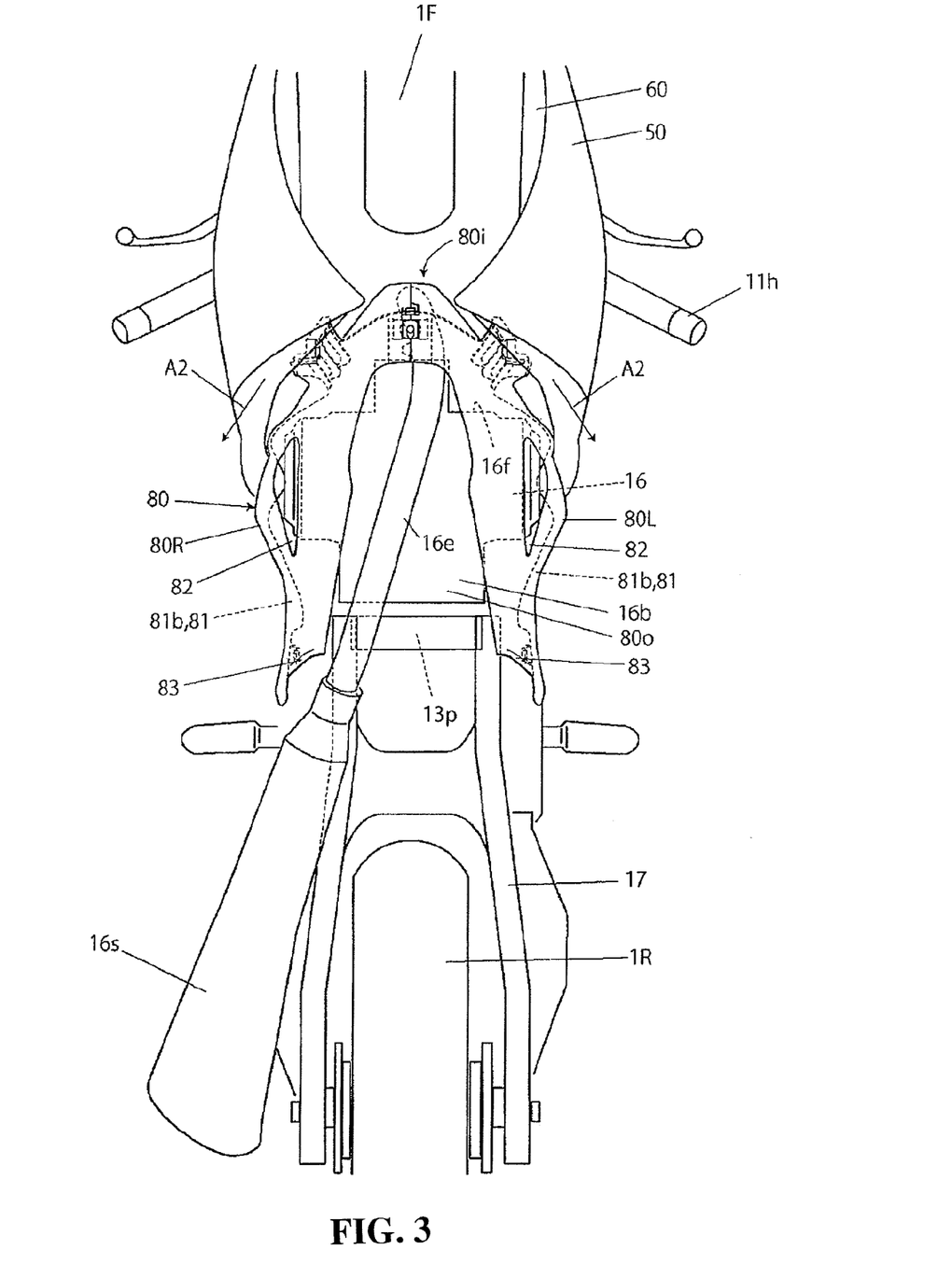
FIG. 3 is a bottom view of the same, from which some parts are omitted.

As shown in FIG. 1 and FIG. 3, the under cowl 80 includes a right cowl 80R and a left cowl 80L, the right cowl 80R and the left cowl 80L respectively arranged on the right and left sides in a travelling direction of the vehicle.

Among both of the cowls 80R and 80L, only one of the cowls may have the above structure as shown in FIG. 1 (right cowl 80R, in this case), for example; or both of the cowls 80R and 80L may have the above structure as shown in FIG. 3, for example. Unless particularly required, the right cowl 80R will be exemplarily described hereinbelow.

As shown in FIG. 2 and FIG. 4(a) to FIG. 6, the guide portion 81 has a slope surface 81b which slopes downwardly from the front to the rear of the vehicle. As shown in FIGS. 5(a), 5(b), and 5(j), the guide portion 81 is formed in such a way so as to bend a part of the side surface of the under cowl 80 inward in the vehicle width direction. The inner surface of the bent part forms the slope surface 81b.

Figures 5A, 5B:
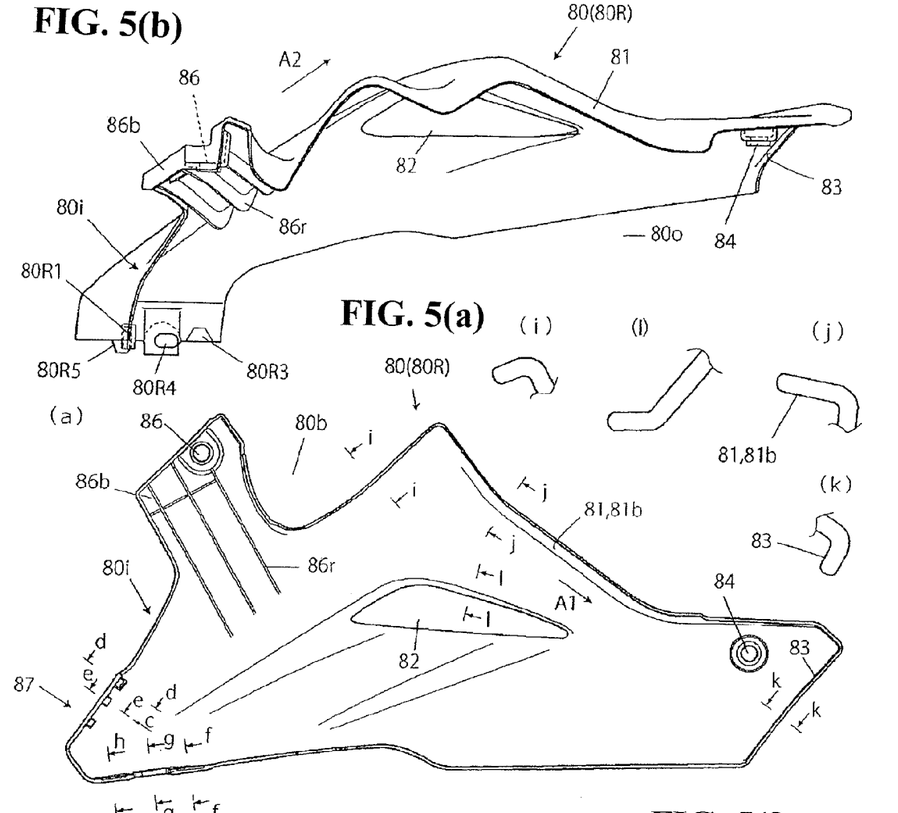
FIGS. 5(a) to 5(h) is also views each showing the under cowl, where 5(a) is a side view thereof seen from an inner side of a vehicle body, 5(b) is a plan view of 5(a), 5(c) is a view indicated by an arrow c in 5(a), and 5(d) to 5(l) are enlarged end views respectively taken along lines d-d, e-e, f-f, g-g, h-h, j-j, k-k, and l-l in 5(a)

In this configuration, the flow of air introduced into the under cowl 80 is guided toward the lower portion of the under cowl as shown by an arrow A1 in FIG. 2 and FIG. 5(a), not toward the upper portion thereof, by means of the slope surface 81b of the guide portion 81. This improves the windshielding effect for a rider.

Figure 4B:
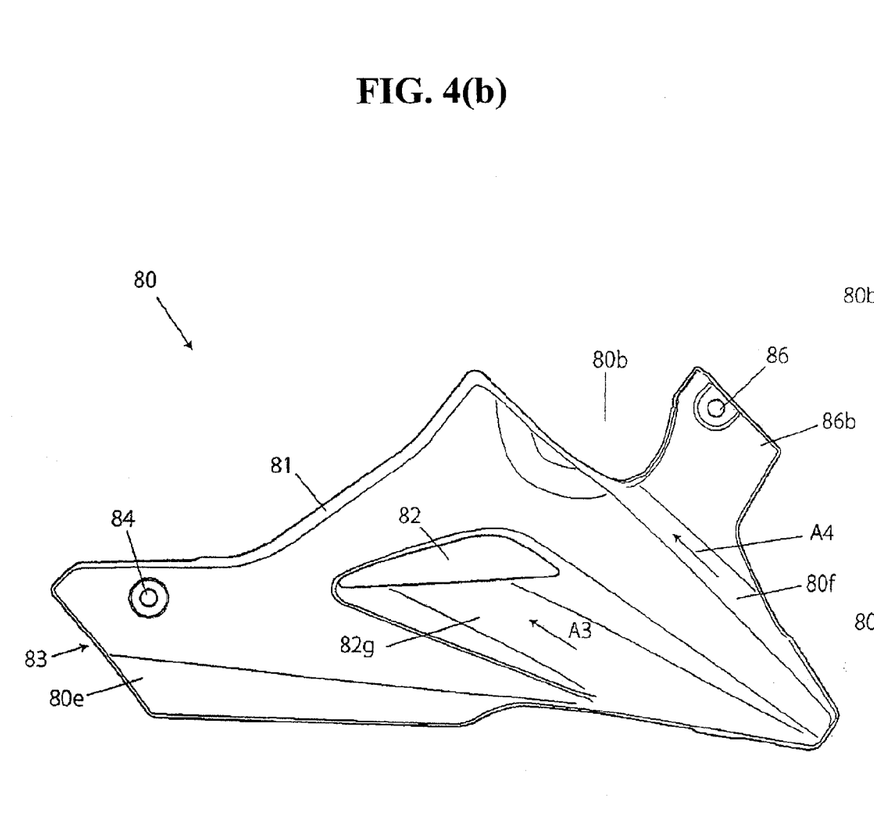

As shown in FIG. 2 and FIGS. 4(a) and 4(b), an inlet air guide portion 82g is formed on an outer surface of the under cowl 80. The inlet air guide portion 82g extends downward to the front from the opening 82 and is recessed inward in the vehicle width direction. This allows efficient introduction of a flow of air toward the opening 82 as shown by an arrow A3.

As shown in FIGS. 4(a) and 4(b), a relief portion 80b is provided in the upper portion of the under cowl 80 to keep the water pump 16w (see FIG. 2) on a side portion of the engine 16 away from the under cowl 80. In addition, a front surface 80f of the under cowl 80 is formed to extend downwardly to the front from the relief portion 80b. This front surface 80f functions as a wind introduction guide which introduces a flow of air to the relief portion 80b as shown by an arrow A4. The front surface 80f thus allows an efficient introduction of a flow of air to the relief portion 80b (i.e., the water pump 16w), and consequently contributes to improvement in an effect of cooling the cooling water circulated by the water pump 16w.

In addition, an uprising wall portion 86b extending upward is provided on the front surface 80f of the under cowl 80, and integrated with the front surface 80f. Together with the front surface 80f, an outer surface of the uprising wall portion 86b guides the flow of air (A4) flowing toward the relief portion 80b. Accordingly, the flow of air can be further efficiently guided to the relief portion 80b (i.e., the water pump 16w).

An attachment portion 86 is provided in an upper portion of the uprising wall portion 86b so as to attach the under cowl 80 to the vehicle body frame 10 directly or indirectly. In FIGS. 5(a), 5(b) and FIG. 6, 86r denotes a reinforcing rib for the uprising wall portion 86b.

As shown in FIG. 1, the under cowl 80 is formed in a V shape in a front view, with the vertex at a lower end thereof. Moreover, the under cowl 80 is formed in such a shape that its width is larger toward the rear in a plan view (in a bottom view as well), as shown in FIG. 3 and FIG. 5(b).

In such a configuration, the flow of air guided by the outer surface of the under cowl 80 is more likely to flow outward in the vehicle width direction as shown by an arrow A2 in FIG. 3 and FIG. 5(b). This allows for an improvement in the performance of wind-shielding for a rider.

As shown in FIG. 1 to FIG. 6, a flow of air introduction portion 80i is provided between the under cowl 80 and a front portion 16f of the engine 16. Moreover, as shown in FIG. 3 and FIG. 5(b), a flow of air release portion 80o is provided between the under cowl 80 and a bottom portion 16b of the engine.

In this configuration, the flow of air introduced into the cowl from the flow of air introduction portion 80i is more easily emitted from the flow of air release portion 80o. This allows for an improvement in the performance of cooling the engine 16 as well as suppression of the flow of warm air to the rider.

As shown in FIG. 2 and FIG. 3, the muffler 16s is arranged at the rear side of the slope surface 81b which constitutes the guide portion 81 of the under cowl 80. The exhaust pipe 16e connected to the muffler 16s is arranged along the under cowl 80.

In this configuration, the flow of air oriented by the slope surface 81b of the guide portion 81 is more likely to flow to the exhaust pipe 16e and the muffler 16s as shown by the arrow A1. Accordingly, this configuration also allows for the cooling of the exhaust pipe 16e and the muffler 16s.

In addition, as shown in FIG. 2 to FIG. 6, a rear end portion (83) of the under cowl 80 is formed into a rear wall 83 in this embodiment. The rear wall 83 is directed rearwardly and toward the center in the vehicle width direction (toward the exhaust pipe 16e). In this configuration, the flow of air which flows along the inner surface of the under cowl can be oriented to the exhaust pipe 16e, thereby allowing further efficient cooling of the exhaust pipe 16e. Meanwhile, a raised bulge portion 80e (see FIGS. 4(a) and 4(b)) projecting outward is formed on the outer surface of the under cowl 80 and behind the recessed inlet air guide portion 82g. The bulge portion 80e integratedly communicates with the inlet air guide portion 82g. The rear wall 83 is formed at a rear end of the bulge portion 80e.

As has been described, the under cowl 80 can be attached to the vehicle body frame 10 directly or indirectly.

In this embodiment, the under cowl 80 has a fixation portion 84 provided in the rear portion thereof, the fixation portion 84 being fixed, with a screw 85, to the pivot plate 13 constituting the vehicle body frame 10. Moreover, the under cowl 80 has the attachment portion 86 provided in the front portion thereof, the attachment portion 86 being fixed to a lower portion 71 of the side panel 70 which is a cover member hung on the side surface of the vehicle.

In this configuration, in the fixation of the under cowl 80 to the vehicle body frame 10 constituting the vehicle body, the under cowl front portion (86) is fixed to the vehicle body frame 10 via the cover member 70. For this reason, the under cowl 80 itself is easily deformable when a flow of air exerts a strong effect thereon. This consequently causes a clearance between the under cowl 80 and the engine 16 or any other vehicle body component (frame, for example) to expand more likely, thereby achieving a favorable flow of the air. Moreover, the deformable structure of the under cowl 80 itself achieves a reduction in weight of the under cowl 80. In addition, the fact that the under cowl front portion (86) is fixed to the vehicle body via the cover member 70 leads to a reduction in the number of portions fastened to the vehicle body, thereby achieving improvement in productivity.

Meanwhile, the side panel 70 is attached to the vehicle body by fixing with a bolt 73 a fixation portion 72 in an upper portion of the side panel 70 to the main frame 12 and by coupling multiple (two, in the drawing) coupler portions 74 provided in a front portion of the side panel 70 to a rear portion of the middle cowl 50.

The left and right under cowls 80L and 80R can be joined together by appropriate means. In this embodiment, joining means 87 is formed at leading end portions of the under cowls 80L and 80R, as shown in FIG. 5(a).

Figures 5C, 5D, 5E:
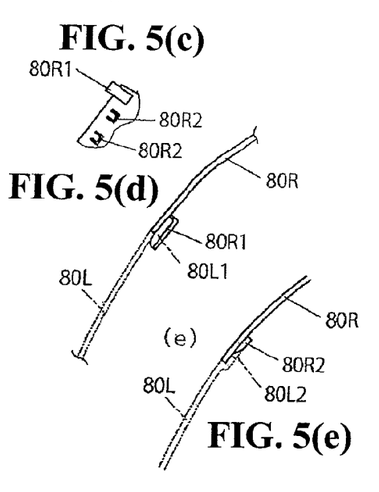
Figure 5F:
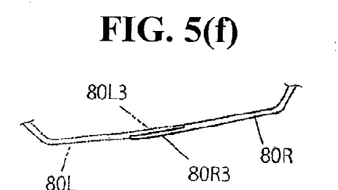
Figure 5G:
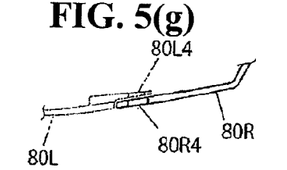
Figure 5H:
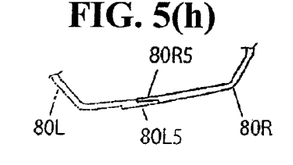

As shown in FIGS. 5(a) and 5(c) as well as FIGS. 5(d) and 5(h) in order, the joining means 87 includes: a plug hole 80R1 provided in one cowl 80R; a plug portion 80L1 which is provided in the other cowl and is to be plugged in the hole 80R1; an engagement claw 80R2 provided in the one cowl 80R; an engagement hole 80L2 which is provided in the other cowl 80L and is to engage with the engagement claw 80R2; a positioning recessed portion 80R3 provided in the one cowl 80R; a positioning projected piece 80L3 which is provided in the other cowl 80L and is to fit in the recessed portion 80R3; joining holes 80R4 and 80L4 which are provided in the respective cowls; a positioning projected piece 80R5 provided in the one cowl 80R; and a positioning recessed portion 80L5 which is provided in the other cowl 80L and is to fit in the projected piece 80R5.

The left and right under cowls 80L and 80R are joined together by engaging the above-mentioned portions in the joining means 87 in a manner as described above, or by performing other processing. The joining holes 80R4 and 80L4 of the respective cowls are joined together by means of an unillustrated bolt and an unillustrated nut, or the like.

Additionally, although the above description has been given by taking the one cowl as 80R and the other cowl as 80L, it is of no matter if the right cowl and the left cowl are reversed. Furthermore, the left and right under cowls 80L and 80R may have the same structure.

Figure 7:
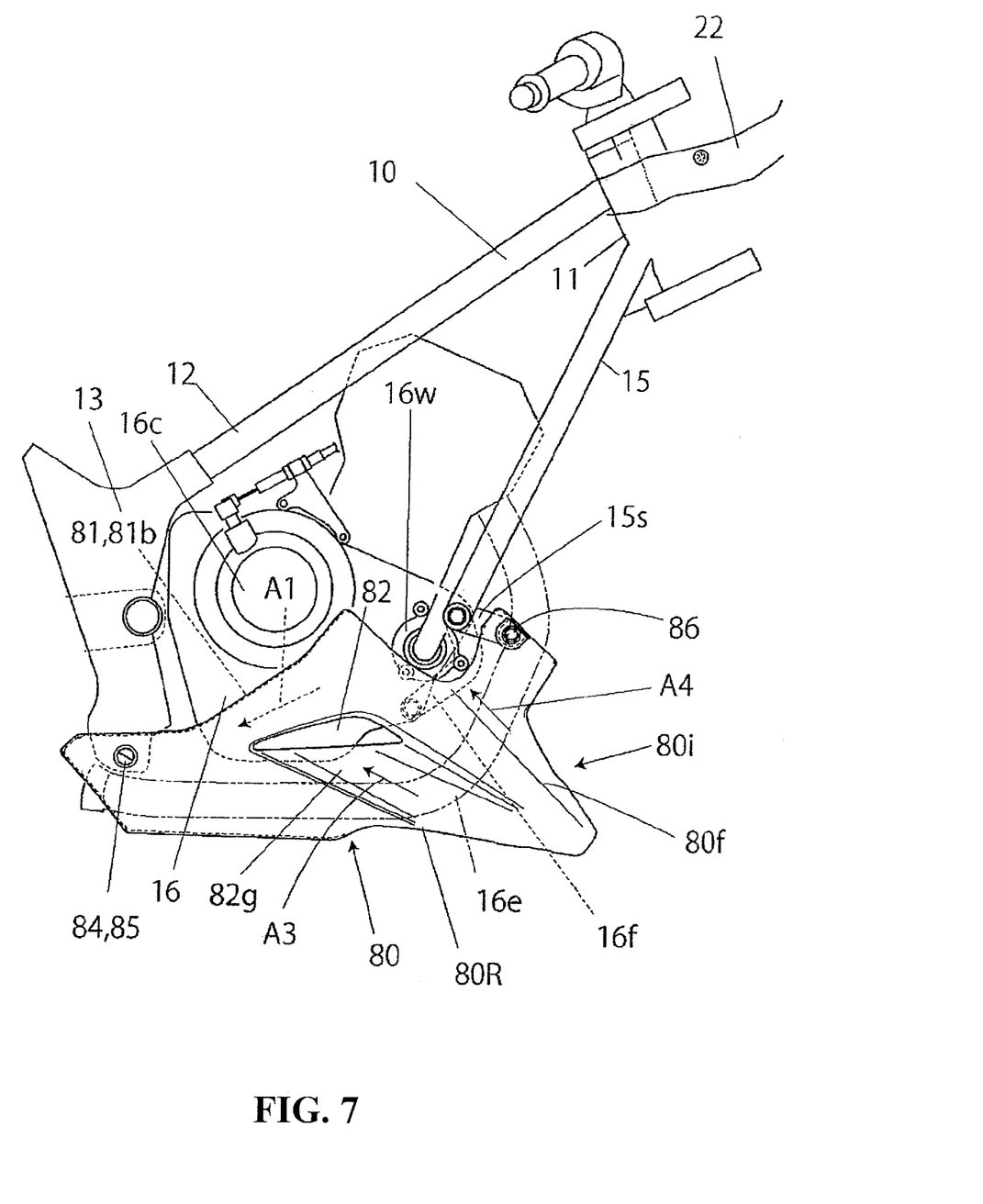
FIG. 7 is a partially enlarged side view showing a modified example of an under cowl attachment structure.

For example, as shown in FIG. 7, the attachment portion 86 of the under cowl 80 may be fixed to a stay 15s integratedly provided to the down tube 15 constituting the vehicle body frame 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cowling structure for a vehicle including:
a vehicle body frame;
an engine suspended from the vehicle body frame;

a seat for a rider to sit thereon, the seat arranged behind and above the engine; and an under cowl for covering at least part of a lower portion of the engine wherein the under cowl covers at least part of a side surface of the engine;

a guide portion provided in an upper portion of the under cowl, the guide portion extending inward in a vehicle width direction and toward the side surface of the engine, and an opening provided in front of the guide portion, the opening introducing a flow of air into the under cowl, wherein the guide portion has a slope surface sloping downwardly and rearwardly from a position forward of a clutch cover to a position rearward of a pivot shaft of the motorcycle.

2. The cowling structure for a vehicle according to claim 1, wherein the under cowl is formed in a V shape with a vertex at a lower end thereof in a front view, and is also formed in such a shape that, in a plan view, its width is larger toward the rear.

3. The cowling structure for a vehicle according to claim 2, wherein a flow of air introduction portion is provided between the under cowl and a front portion of the engine, and a flow of air release portion is provided between the under cowl and a lower portion of the engine.

4. The cowling structure for a vehicle according to claim 1, wherein a flow of air introduction portion is provided between the under cowl and a front portion of the engine, and a flow of air release portion is provided between the under cowl and a lower portion of the engine.

5. The cowling structure for a vehicle according to claim 1, wherein a muffler is arranged at a rear side of the slope surface of the guide portion, and an exhaust pipe connected to the muffler is arranged along the under cowl.

6. The cowling structure for a vehicle according to claim 1, wherein a muffler is arranged at a rear side of the slope surface of the guide portion, and an exhaust pipe is arranged along the under cowl, and the exhaust pipe is connected to the muffler at a position adjacent to a rear most portion of the guide portion.

7. The cowling structure for a vehicle according to claim 1, wherein the under cowl has a rear portion thereof fixed to the vehicle body frame and has a front portion thereof fixed to a cover member hung on a side surface of the vehicle.

8. The cowling structure for a vehicle according to claim 1, wherein the under cowl has a rear portion thereof fixed to the vehicle body frame and has an attachment portion provided on a front portion thereof fixed to a lower portion of a cover member hung on a side surface of the vehicle.

9. The cowling structure for a vehicle according to claim 8, wherein the attachment portion provided on the front portion of the under cowl is arranged forward of a water pump on a side portion of the engine.

10. The cowling structure for a vehicle according to claim 8, wherein reinforcing ribs are provided on the front portion of the under cowl adjacent to the attachment portion.

11. A cowling structure for a motorcycle including:

a body frame;

an under cowl for covering at least part of a lower portion and a side surface of an engine;

a guide portion provided in an upper portion of the under cowl, the guide portion extending inward in a motorcycle width direction and toward the side surface of the engine; and an opening provided in front of the guide portion, the opening introducing a flow of air into the under cowl, wherein the guide portion has a slope surface which slopes downwardly and rearwardly from a position forward of a clutch cover to a position rearward of a pivot shaft of the motorcycle.

12. The cowling structure for a vehicle according to claim 11, wherein a muffler is arranged at a rear side of the slope surface of the guide portion, and an exhaust pipe is arranged along the under cowl, and the exhaust pipe is connected to the muffler at a position adjacent to a rear most portion of the guide portion.

13. The cowling structure for a motorcycle according to claim 11, wherein the under cowl is formed in a V shape with a vertex at a lower end thereof in a front view, and is also formed in such a shape that, in a plan view, its width is larger toward the rear.

14. The cowling structure for a motorcycle according to claim 1, further comprising:

a relief portion is provided in the upper portion of the under cowl to keep a water pump on a side portion of the engine away from the under cowl.

15. The cowling structure for a motorcycle according to claim 11, further comprising:

a relief portion is provided in the upper portion of the under cowl to keep a water pump on a side portion of the engine away from the under cowl.

\* \* \* \* \*